March 21, 1967 S. A. WINGATE 3,310,798

ANALOG TO DIGITAL OPTICAL ENCODER

Filed Oct. 1, 1963 3 Sheets-Sheet 1

INVENTOR.
Sidney A. Wingate
BY
Morse & Altman
ATTORNEYS

March 21, 1967 S. A. WINGATE 3,310,798

ANALOG TO DIGITAL OPTICAL ENCODER

Filed Oct. 1, 1963 3 Sheets-Sheet 2

INVENTOR.
Sidney A. Wingate
BY
Morse & Altman
ATTORNEYS

INVENTOR.
Sidney A. Wingate
BY
Morse & Altman
ATTORNEYS

United States Patent Office 3,310,798
Patented Mar. 21, 1967

3,310,798
ANALOG TO DIGITAL OPTICAL ENCODER

Sidney A. Wingate, Concord, Mass., assignor to Wayne-George Corporation, Newton, Mass., a corporation of Massachusetts Filed Oct. 1, 1963, Ser. No. 313,086
12 Claims. (Cl. 340—347)

The present invention relates to the generation of digital information as a function of angular position and, more particularly, to the determination of extremely precise information in regard to shaft angularity by a so-called shaft angle encoder. In a typical shaft angle encoder, angular position is determined in conjunction with a coded component (e.g. a disk) that is provided about its axis with at least one coded track having alternate increments (e.g. opaque and clear), which alternately actuate (e.g. direct radiation toward and obscure radiation from) a sensing arrangement (e.g. photoelectric transducing). In a so-called direct reading shaft angle encoder, the coded disk is provided with a series of concentric tracks and an associated bank of sensing components. Read-out, in effect, involves sensing a selected grouping of coded increments that extends from track to track (e.g. along a stationary radial line relative to the rotatable disk). In a so-called incremental encoder, the coded disk is provided with a single peripheral track. Read-out, in effect, involves counting the alternate increments from a reference point to provide pulses which digitally indicate shaft angularity or shaft velocity. In shaft angle encoders of the foregoing type, various limitations on angular resolution exist. One limitation on angular resolution is incremental width along with code track, in other words, total number of increments physically specified (as by available light and structural limitations) in the code track. Another limitation on angular resolution is error resulting from eccentricity and ellipticity, eccentricity referring to deviation of the actual axis of rotation of the disk with respect to the theoretical axis of rotation, and ellipticity referring to deviation of code track shape from exactly circular.

The present invention contemplates a simple and efficacious technique for obviating limitations on angular resolution resulting from code track increment width and structurally generated error. It is found that angular displacement of an encoder of the foregoing type causes an associated sensing component to produce an outlet signal that, as a practical matter, is sinusoidal. It has been shown (U.S. patent applications Ser. No. 249,286, filed Jan. 3, 1963 and Ser. No. 279,071, filed May 9, 1963, each entitled "Shaft Angle Encoding" in the name of Sidney A. Wingate, and being incorporated herein by reference, of which the present application is a continuation in part) that it is possible to utilize at least two sensing arrangements of the foregoing type at different angular positions with respect to the code track in order to produce at least two wave forms that are displaced in phase from each other. These wave forms may be analyzed by a vector summing component capable of dividing the actual increments of the code track into smaller increments. An inherent feature of an encoder utilizing at least two output wave forms in the foregoing way is that its ultimate accuracy depends only on the outer track (with reference primarily to direct reading shaft angle encoder and unlike prior conventional Gray encoders requiring corresponding accuracy of all tracks). It has been found that each of the two contemplated wave forms may be produced conveniently by averaging the outputs of sensing arrangements that are located at in-phase positions around the code track in order to compensate for such error as eccentricity and ellipticity. By virtue of the possibility of such averaging only at a single code track and the absence of a necessity for such averaging also at other additional code tracks, it has been found that such error can be obviated with unusually few components and unprecedentedly desirable results.

Accordingly, the primary object of the present invention is the subdivision of the smallest increments of a shaft angle encoder track by analysis of a plurality of output composite signals, constituting substantially out-of-phase representations of angularity, each composite signal being generated by a plurality of output component signals, constituting approximately in-phase representations of angularity.

Other objects of the present invention are the provision of a shaft angle encoder of the foregoing type, in which: the number of output component signals generating a composite signal is at least three; in which the composite signal is a wave form produced by an operational amplifier to which component wave forms are applied; and in which the component signals are digitized and thereafter combined digitally to produce composite signals digitally representing angularity.

Still other objects of the present invention will in part be obvious and will in part appear hereinafter.

For a fuller understanding of the nature and objects of the present invention, reference should be had to the following detailed description, taken in connection with the accompanying drawing, wherein:

FIGS. 1 to 5 graphically illustrate certain principles of the present invention;

Figure 1:
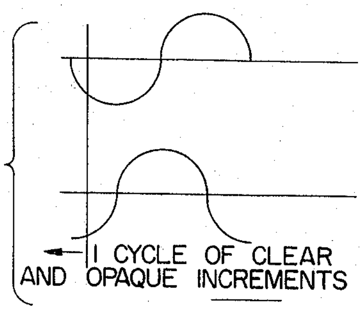
Figure 2:
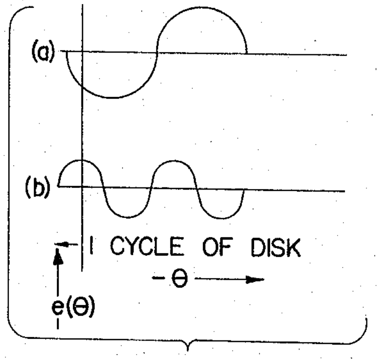

Generally, each of the illustrated embodiments of the present invention comprises, as an encoder in cooperation with the output shaft of an instrument or the like, a disk presenting at its periphery at least a track of alternate opaque and transparent increments, a pair of photocells displaced from each other along the track by 90° in terms of one cycle of opaque and transparent increments and illumination for the code track in registration with slits for transmitting radiation to the photocells. Ordinarily the disk is composed of glass and the track is provided by silver halide photography in terms of silvered and clear regions of a gelatine stratum. Details of such an encoder are described for example, in U.S. patent application Ser. No. 168,473, filed Jan. 25, 1962 and now Patent No. 3,187,187, in the name of Sidney A. Wingate, for Shaft Encoder. The outputs of the photocells, as shown in FIG. 1, are a pair of analog position signals of the form $E=E_n \sin 2\pi n\theta$, and $E=E_n \cos 2\pi\theta$, where E is instantaneous amplitude, $E_n$ is maximum amplitude, $1/n$ is period duration and $\theta$ is instantaneous angular displacement. Generally, each of the illustrated output systems comprises a pair of amplifying components for these analog position signals, a vector summing component for comparing the instantaneous amplitudes of the resulting signals and an indicating component for presenting the resulting information, the components of each of the output systems incorporating an arrangement for correcting error, particularly, eccentricity and ellipticity, resulting from structural imperfections. FIGS. 2($a$) and ($b$) are plots of error in the indication of the angle of the system, $e(\theta)$, against actual angle of the system as the code disk goes through one complete revolution, FIG. 2($a$) referring to eccentricity and FIG.

2(*b*) referring to ellipticity. So-called run-out error is simply instantaneously varying eccentricity due to motion within bearings and is corrected with eccentricity resulting from a permanent inaccuracy in the axial position of the center of the code disk. In the illustrated systems the error is obviated by averaging output wave forms at spaced positions about the code disk, it having been found that most of such error may cancel itself out when the output wave forms are generated at three or more equally spaced positions around the code disk, most advantageously (it now appears) at four positions, 90° apart, around the code disk. The averaging is analog in the systems of FIGS. 6 and 8 and is digital in the system of another embodiment.

Figure 7:
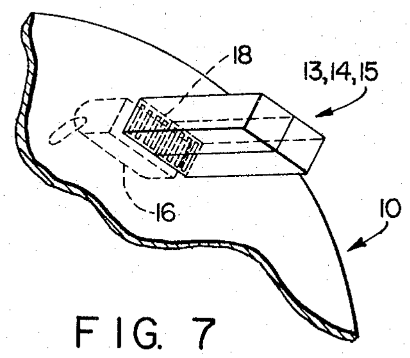
FIG. 7 is a perspective view of certain details of the system of FIG. 1.
Figure 6:
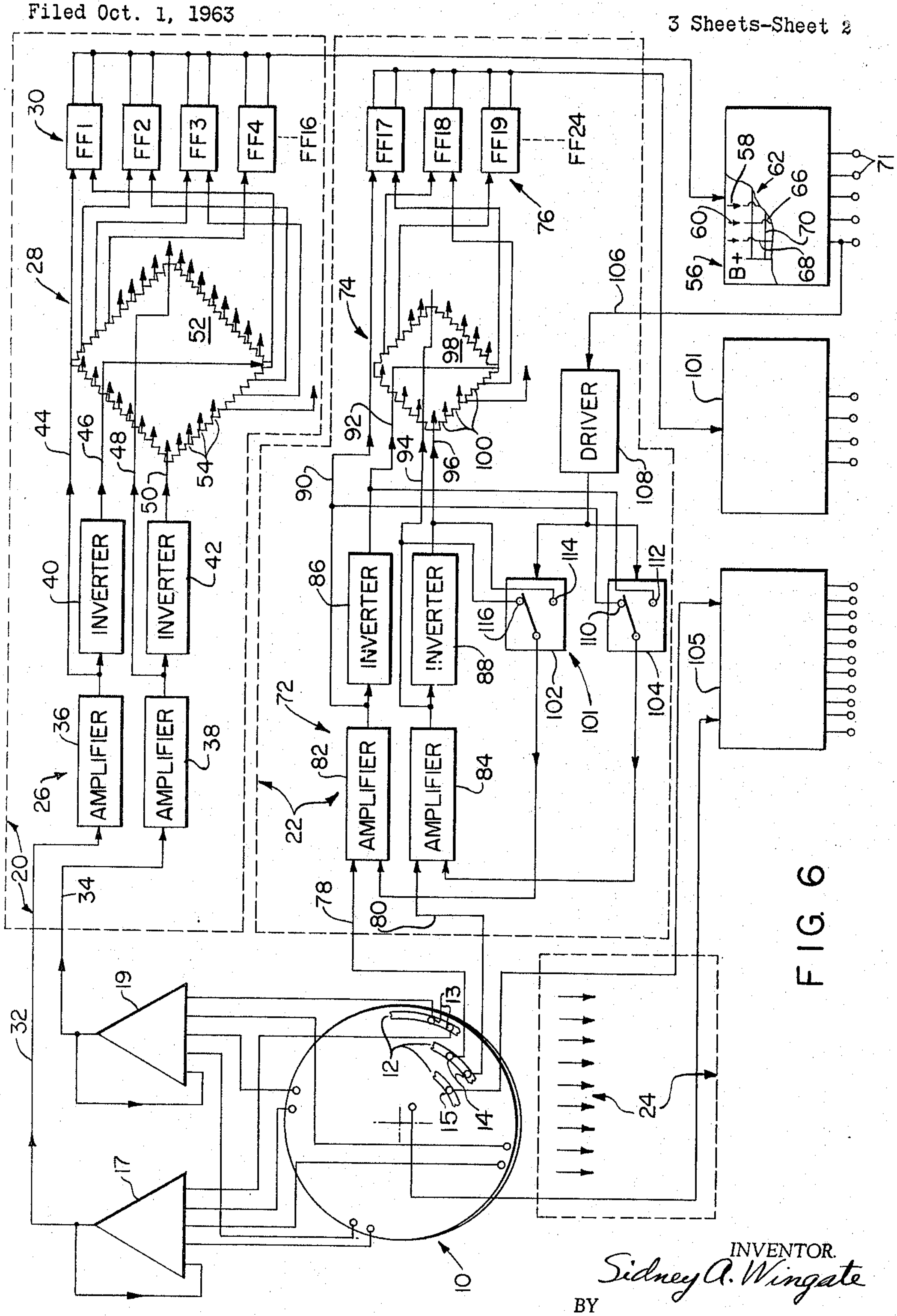
FIG. 6 is a diagrammatic view; partly in mechanical perspective and partly in electrical schematic, of an encoding system embodying the present invention.

The system of FIGS. 6 and 7 comprises, as an encoder for association with the output shaft of an instrument or the like, a disk 10 presenting a plurality of concentric code tracks 12 of alternate opaque and clear increments, particular arrangements of photocells 13, 14 and 15 in registration with code tracks, and suitable sources 16 (FIG. 7) of illumination for the code tracks. Ordinarily, the disk is composed of glass and the track is provided by silver halide photography in terms of silvered and clear regions of a gelatine stratum. Details of such an encoder are described, as indicated above, in U.S. patent application Ser. No. 168,473, filed Jan. 25, 1962, in the name of Sidney A. Wingate for Shaft Encoder. As shown in FIG. 7, photocells 13 and 14 are grouped into pairs, the photocells of each pair being spaced from each other by 90° in terms of a single opaque increment, clear increment cycle. Each of these photocells receive illumination through a series of slits 18 which present a sequence of blocking and transmitting increments of substantially the same dimensions as the opaque and clear increments of the code track for the purpose of transmitting optimum light flux while maintaining maximum optical resolution.

Photocells 13 are grouped into four pairs, spaced at 90° intervals with respect to the 360° periphery of code disk 10. As indicated above, each pair of photocells produces a pair of analog position signals that are 90° out-of-phase. However, the four pairs are arranged so that a first group of four photocells produce analog position signals that are approximately in-phase with each other and a second group of four photocells produce analog position signals that are approximately in-phase with each other. The analog position signals of the first group are applied to an operational amplifier 17 and the analog position signals of the second group are applied to an operational amplifier 19. The sinusoidally variable output of operational amplifier 17 constitutes a sinusoidally variable average of its sinusoidally variable inputs and the sinusoidally variable output of operational amplifier 19 constitutes a sinusoidally variable average of its sinusoidally variable inputs.

For purposes to be explained in detail below, in the illustrated embodiment, the pair of photocells of the second or next-outermost track 14 is similar to a pair of photocells of the first track and the photocell arrangement of the remaining tracks incorporates a single photocell for a single code track. The photocell arrangement associated with any single code track applies its output essentially through a single channel to provide in combination with outputs of the remaining photocells through other channels, a composite representation of angular position of disk 10. The channel for the first code track is designated 20, for the second code track 22 and for the remaining code tracks 24.

Figure 3:
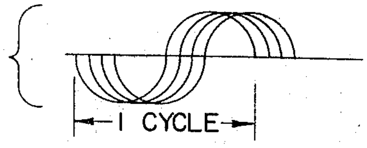
Figure 4:
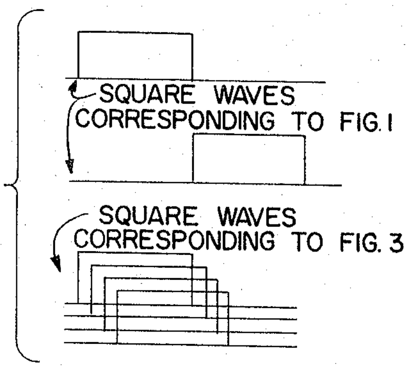
Figure 5:
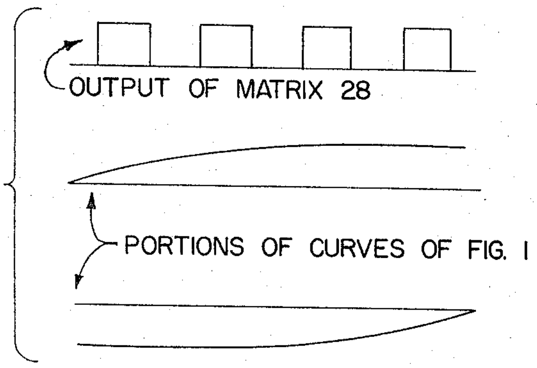

Channel 20 for the first code track generally includes a transfer component 26 for presenting the sinusoidal signals to the remainder of the channel in useful form, a vector distinguishing component 28 for evaluating certain relationships characterizing these sinusoidal signals, and a flip-flop arrangement 30 for digitizing signals representing these relationships. The 90° out-of-phase sinusoidal wave forms generated at 32, 34, shown in FIG. 1, are applied to a pair of amplifiers 36, 38. As suggested in FIGS. 3 and 4, the output of amplifier 36 is applied to an inverter 40 and the output of amplifier 38 is applied to an inverter 42. The consequent four quadrature signals, as at 44, 46, 48, 50, are applied to the four corners of a bridge network 52 of resistors 54. By utilizing a sequence of oppositely positioned taps of bridge network 52, sixteen pairs of taps in the illustrated case, thirty-two sinusoidal signals, 360°/32=11.25° out-of phase from wave form to wave form as in FIG. 3, are produced. The differences in the periods of the original sinusoidal wave forms and the final flip-flop outputs are suggested in FIG. 5. Each of the sixteen pairs of signals is applied to a direct current flip-flop of flip-flop arrangement 30, which consists of sixteen such flip-flops, shown in the drawing as FF1 to FF16. The outputs, FIG. 4, of these flip-flops are utilized by a conventional matrix 56 to produce an indication of five digits, the least significant in this system, in the following manner. Flip-flops FF1 to FF16 operate through driving amplifiers 58, 60 (which may be omitted optionally) to a diode matrix 62. Each of the input lines from the driving amplifiers represent the "0" and "1" states and are selectively connected to a five-digit output through diodes 66 (which are indicated by the small D-shaped symbols in conventional fashion). The input lines, two per flip-flop, are designated 68 and the output lines 70. In conventional fashion, when all of the input lines 68 associated with a given output line are energized, the associated indicator 71 is energized.

In considering the information provided by the first track, it is apparent that although a particular portion of a single incremental cycle (a single adjacent opaque increment, clear increment pair) is designated, the identity of no particular one of the multiplicity of incremental cycles in the first code track is designated. Assuming as in the present case a twenty digit output, having established the least five significant digits as above, it would be possible to utilize fifteen additional tracks in natural binary code. However, it is a property of natural binary code that whenever a change from 0 to 1 in a more significant digit occurs, it is accompanied by a change in a less significant digit. Stated generally, when several digital indications are designed to change at any given time in logic circuitry, accurate operation of this circuitry requires that they do change at that given time or that some compensatory or carry-over logic circuitry be provided to obviate any unintended change. In other words, as will be discussed below in detail, since it is impossible to provide code tracks in which, as a practical matter, exact coincidence of leading and lagging edges exists, appropriate carry-over logic circuitry is required.

In the illustrated system, several of the aforementioned possible fifteen auxiliary code tracks are eliminated by the inclusion of a second code track similar to though coarser than the first track. Specifically the increments of the second track are sixteen times as large as the increments on the first track. Also, carry-over logic circuitry is provided.

Channel 22 for the second code track generally includes a transfer component 72 for presenting the sinusoidal signals from the second track to the remainder of the channel in useful form, a vector distinguishing component 74 for evaluating certain relationships characterizing these sinusoidal signals, and a flip-flop arrangement 76 for digitizing signals representing these relationships. The 90° out-of-phase sinusoidal wave forms generated at 78, 80, analogous to the wave forms at 32, 34 are applied to a pair of amplifiers 82, 84. The output of amplifier 82 is applied to an inverter 86 and the output of amplifier 84 is applied to an inverter 88. The consequent four quadrature signals, as at 90, 92, 94, 96, are applied to the four corners of a bridge network 98 of resistors 100. By utilizing a sequence of oppositely positioned taps of bridge network 98, eight pairs of taps in the illustrated case, sixteen sinusoidal signals, 360°/16=22.50° out-of-phase from wave form to wave form, are produced. Each of the eight pairs of signals is applied to a direct current flip-flop of flip-flop arrangement 76, which consists of eight such flip-flops, shown in the drawing as FF17 to FF24. The outputs of these flip-flops are utilized by a conventional matrix 101, analogous to matrix 56, to produce an indication of four digits, of next greater significance relative to the five digits produced by channel 20.

The carry-over logic circuitry of the illustrated system, generally designated by 101, operates to guarantee that a transition in the signal from the second track occurs simultaneously with a corresponding transition in the first track. Electronically, this guarantee is effected by adding or subtracting small signal increments to the signal outputs associated with the second track at the command of the output associated with the first track. Specifically, with respect to theoretically aligned edges of increments of the first and second tracks, an indication of the increment of the first track is combined with an indication of the increment of the second track to ensure that no indicated change in the second track can occur in the absence of an indicated change in the first track. This carry-over logic circuitry includes a pair of ganged transistor switches 102, 104 which are controlled by an output 106 from logic circuitry 56 through a driving amplifier 108. It will be observed that the sinusoidal outputs of amplifier 82 and inverter 86 are fed to input terminals 110, 112 of switch 104 and that the sinusoidal outputs of amplifier 84 and inverter 88 are fed to input terminals 114, 116 of switch 102. The output of switch 102 is fed to amplifier 82 and the output of switch 104 is fed to amplifier 84. Thus, when the specified output from the first track is "1," a small fraction of the cosine output of the second track is added to the sine input of the second track and a small fraction of the sine output of the second track is subtracted from the cosine input of the second track to develop a slightly lagging composite output. The transition of this composite output is guaranteed not to come before the corresponding transition of the first track. When the specified output from the first track goes from "1" to "0," a small fraction of the sine output of the second track is added to the cosine input of the second track and a small fraction of the cosine output is subtracted from the sine input of the second track to develop a slightly leading composite input. The transition of the composite output is guaranteed not to come after the corresponding transition of the first track. Thus at the instant of the "1" or "0" transition of the first track, the corresponding transition of the second track output occurs.

The remaining code tracks of the illustrated system are eleven in number, being associated with a suitable output 105. Each track is associated with a single photocell and slit arrangement, corresponding to one-half of the unit shown in FIG. 7. At any particular shaft angle, each produces a "0" or "1" natural binary output. Thus, the code disk 10 of the encoder of FIG. 6 includes 13 tracks of alternate opaque and clear increments, one pair of opaque and clear increments on any track constituting an incremental cycle in that track. The inner eleven or third to thirteenth code tracks are such that, in the case of each adjacent pair of code tracks, the outer code track has twice as many incremental cycles as the inner code track and a transition (from clear to opaque increment or vice versa) in an inner code track necessarily is accompanied by a transition in the outer code track. However, the outermost track may have a number of cycles that is $2^n$ times the numbers of cycles in the next to outermost track. The arrangement is such that any transition on any inner track is made to be coincident with a corresponding transition in the outermost code track. Also, the number of cycles in the next-outermost or second code track is one-half (or some other arbitrary fraction) the number of cycles of the first code track. Generally, the number of cycles in the first track, for a natural binary output of the foregoing kind, is $2^n$, a practical number being $2^{15}$ for a code disk of from 5 to 10 inches in diameter.

Figure 8A:
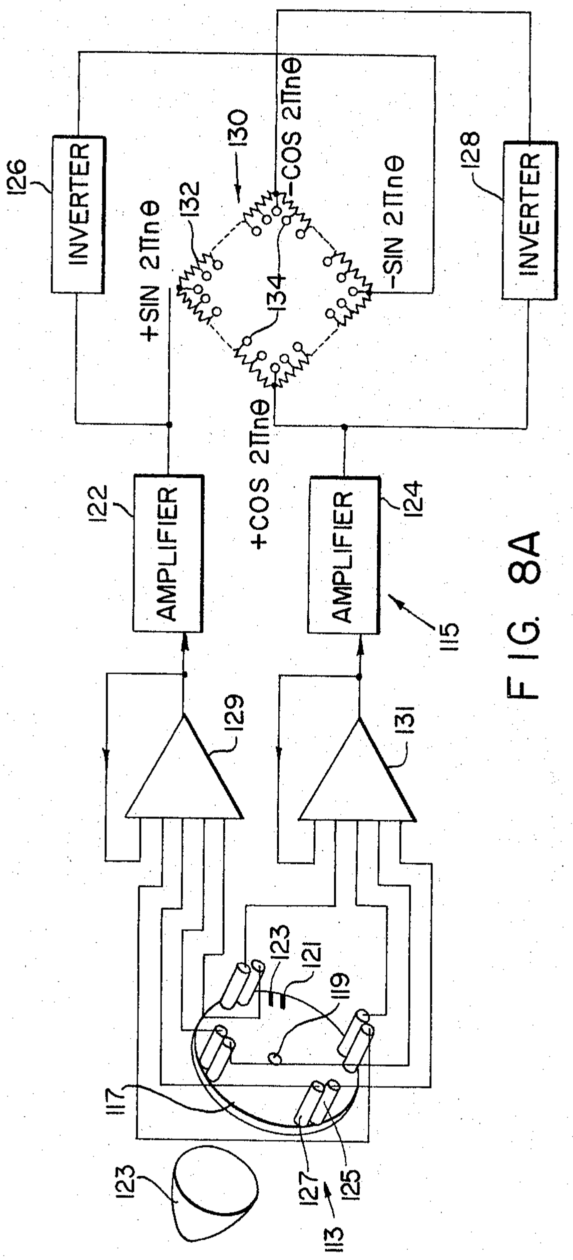
FIG. 8A is a diagrammatic view, partly in mechanical perspective and partly in electrical schematic, of another encoding system embodying the present invention.

The system of FIG. 8A generally comprises an incremental encoder system 113 associated with any desired instrument and an output system 115. As shown, encoder system 113 includes a transparent glass disk 117 axially mounted on shaft 119 for rotation therewith and having at its periphery a track of alternately opaque and transparent increments 121 and 123. Four pairs of photocells 125 and 127 are in registration with track 121, 123, at 90° intervals thereabout. The photocells of each pair are displaced in such a way that they are 90° from each other in terms of the phase of a single cycle of opaque and transparent increments. Sensing by photocells 125 and 127 of track 121, 123 occurs through slits (like those of FIG. 7) capable of resolving between adjacent opaque and transparent increments. In registration with photocells 125 and 127 is an illumination source (like that of FIG. 7). As in the system of FIG. 6, each pair of photocells produces a pair of analog position signals that are 90° out-of-phase. However, the four pairs are arranged so that a first group of four photocells produce analog position signals that are approximately in-phase with each other and a second group of four photocells produce analog position signals that are approximately in-phase with each other. The analog position signals of the first group are applied to an operational amplifier 129 and the analog position signals of the second group are applied to an operational amplifier 131. The sinusoidally varying output of operational amplifier 129 constitutes a sinusoidally varying average of its sinusoidally varying inputs and the sinusoidally varying output of operational amplifier 131 constitutes a sinusoidally varying average of its sinusoidally varying inputs.

Figure 8B:
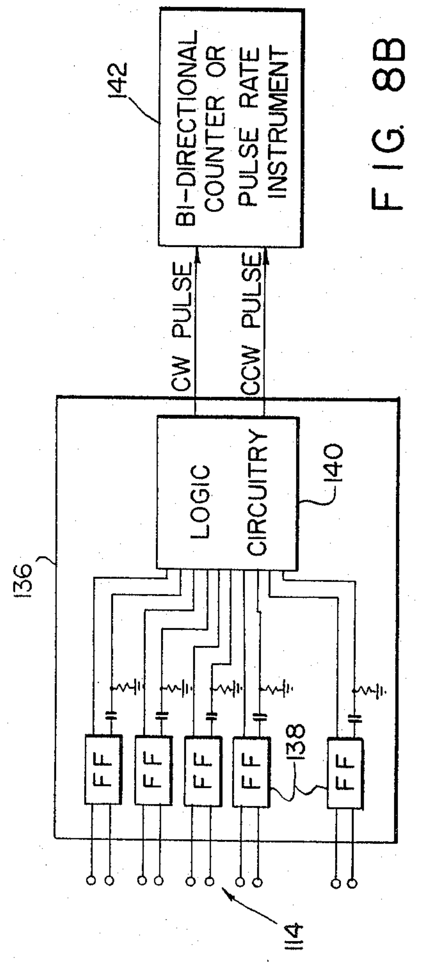
FIG. 8B is a diagrammatic view of detection circuitry suitable for use with the embodiment of FIG. 8A.

The two resulting composite sinusoidal signals are amplified at 122 and 124. These two signals plus two additional signals produced thereby at inverters 126 and 128 constitute a total of four quadrature signals, which are applied to the four corners of a bridge network 130 of resistors 132. It will be understood that phase angle here is related to shaft position. By utilizing a sequence of oppositely positioned taps of bridge network 130, e.g. taps 134, a plurality of out-of-phase sinusoidal signals are produced as in FIG. 3. These signals are applied to conventional cross-over detection circuits 136 to provide a sequence of pulses, which are applied to a sequence of flip-flops 138 as shown in FIG. 8B. These flip-flops are suitably coupled to logic circuitry 140 for decoding in a suitable output 142.

In operation the logical circuitry distinguishes between the sequence of pulses representing clockwise rotation of the shaft and the sequence of pulses representing counterclockwise rotation of the shaft. It will be understood that the number of sinusoidal signals of the type illustrated in FIG. 3 may be varied in accordance with the number of taps 134 available in bridge 130.

The present invention thus provides a simple but efficacious technique for increasing the resolution of an optical encoder beyond that normally resulting from limitation to a specified number of track increments. Since certain changes may be made in the foregoing disclosure without departing from the scope of the invention herein involved, it is intended that all matter contained in the foregoing disclosure or shown in the accompanying drawings shall be interpreted in an illustrative and not in a limiting sense.

What is claimed is:

1. An encoding system comprising code means presenting at least one track, a plurality of pairs of photocell means in registration with said track, illumination means for directing radiation to said track, said track having first regions for directing radiation to said photocell means and second regions for obscuring radiation from said photocell means, said first regions and said second regions being alternately sequenced, relative movement of said code means and said pairs of photocell means causing said photocell means to produce a plurality of pairs of out-of-phase signals, first signals of said pairs being approximately in-phase with each other, second signals of said pairs being approximately in-phase with each other, said plurality of pairs of out-of-phase signals constituting preliminary signals, vector summing means responsive to said preliminary signals to provide further signals, said preliminary signals and said further signals constituting representations of geometrical relationships between said code means and said plurality of photocell means, and electronic means for averaging certain of said representations in order to provide indications thereof.

2. The encoding system of claim 1 wherein said means for averaging includes means for averaging said first signals and means for averaging said second signals.

3. The encoding system of claim 1 wherein said means for averaging includes means for averaging said further signals.

4. A shaft encoding system comprising a code disk mounted for rotation on said shaft, said code disk presenting a track, a plurality of pairs of photocells angularly spaced in registration with said track, illumination means for directing radiation to said track, said track having clear regions for directing radiation to said photocells and opaque regions for obscuring radiation from said photocells, said opaque regions and said clear regions being altenately sequenced, rotation of said code disk means causing said photocells to produce a plurality of pairs of out-of-phase substantially sinusoidal signals, first signals of said pairs being approximately in-phase with each other, second signals of said pairs being approximately in-phase with each other, electronic means for averaging said first signals to produce a composite signal, means for averaging said second signal to produce a composite signal and vector summing means responsive to said composite signals to provide a representation of information relating to said shaft.

5. The shaft encoding system of claim 4 wherein said vector summing means includes means for inverting said pair of out-of-phase substantially sinusoidal signals in order to produce four quadrature substantially sinusoidal signals, a resistor bridge for receiving said four quadrature signals, and a plurality of taps on said resistor bridge for generating additional signals therefrom.

6. The shaft encoding system of claim 5 wherein said means for averaging includes an operational amplifier for averaging said first signals and an operational amplifier for averaging said second signals.

7. An encoding system comprising code means presenting a plurality of track means, an array of groups of photocell means, said code means and said array being constrained for relative movement with said plurality of track means and said plurality of photocell means in registration, said photocell means of each group being related to each other predeterminedly, illumination means for directing radiation to said plurality of track means, each of said plurality of track means having first regions and second regions for differently associating said radiation with photocell means registered therewith, said groups of photocell means generating groups of predeterminedly different signals representing relative positions of said code means and said array, one of said groups of predeterminedly different signals including a plurality of pairs of out-of-phase signals, first signals of said pairs being in-phase with each other, second signals of said pairs being in-phase with each other, electronic first averaging means for averaging said first signals, electronic second averaging means for averaging said second signals, first analyzing means for distinguishing among the outputs of said first averaging means and said second averaging means to produce resolved signals representing components of said different signals within said selected groups, digitizing means responsive to said resolved signals for converting said resolved signals to digital signals, other means for distinguishing among others of said predeterminedly different signals of said plurality of groups to produce other signals, and interrelating means for combining said digital signals and said other signals for presentation.

8. The encoding system of claim 7 wherein said outputs of said first averaging means and said second averaging means are out-of-phase sinusoids.

9. The encoding system of claim 8 wherein said resolved signals are of a given number and said digitizing means includes one-half said given number of flip-flops.

10. The encoding system of claim 7 wherein said resolved signals are of a number corresponding to divisions of a single incremental cycle of one of said track means and said presentation is natural binary.

11. A shaft angle encoding system comprising a code disk mounted for rotation on said shaft, said code disk presenting a plurality of tracks concentric about said shaft, a plurality of first pairs of photocells in registration with a first track of said plurality of tracks, said first pairs of photocells being spaced from each other predeterminedly, illumination means for directing radiation to said code disk, said first track having first regions for directing radiation to said first pair of photocells and second regions for obscuring radiation from said first pair of photocells, said first regions and said second regions of said first track being alternate in sequence, an adjacent pair of one of said first regions of said first track and one of said second regions of said first track constituting a single cycle of said first track, a second pair of photocells in registration with a second track of said plurality of tracks, said second pair of photocells being spaced from each other predeterminedly, said second track having first regions for directing radiation to said second pair of photocells and second regions for obscuring radiation from said second pair of photocells, said first regions and said second regions of said second track being alternate in sequence, an adjacent pair of one of said first regions of said second track and one of said second regions of said second track, a plurality of additional photocells in proper registration with remaining tracks of said code disk, said first pairs of photocells generating first pairs of sinusoidal signals, first signals of said first pairs being approximately in-phase with each other, second signals of said first pairs being approximately in-phase with each other, a first operational amplifier for electronically averaging said first signals to produce a first composite signal, a second operational amplifier for electronically averaging said second signals to produce a second composite signal, a first pair of amplifiers for amplifying said first composite signal and said second composite signal, a first pair of inverters for producing a first pair of inverted signals in response to a first pair of amplified signals for said first pair of amplifiers, a first bridge having a number of impedances separated from each other by taps in sequence along lengths thereof, said first pair of amplified signals being applied to a first pair of spaced taps of said first bridge, said first pair of inverted signals being applied to a second pair of spaced taps of said first bridge, an increased number of pairs of signals appearing at said taps of said first bridge, said second pair of photocells generating a second pair of sinusoidal signals, a second pair of amplifiers for amplifying said second pair of signals, a second pair of inverters for producing a second pair of inverted signals in response to a second pair of amplified signals from said second pair of amplifiers, a second bridge having a number of impedances separated from each other by taps in sequence along lengths thereof, said second pair of amplified signals being applied to a first pair of spaced taps of said second bridge, said second pair of inverted signals being applied to a second pair of spaced taps of said second bridge, an increased number of pairs of signals appearing at said taps of said second bridge, a plural number of first flip-flops for receiving said increased number of pairs of signals at said taps of said first bridge, a plural number of second flip-flops for receiving said increased number of pairs of signals at said taps of said second bridge, a plural number of additional flip-flops operatively responsive to signals from said additional photocells, said first flip-flops providing together a coded indication of said angle.

12. A shaft angle encoding system comprising a code disk mounted for rotation on said shaft, said code disk presenting a plurality of tracks concentric about said shaft, a plurality of first pairs of photocells in registration with a first track of said plurality of tracks, said first pairs of photocells being spaced from each other predeterminedly, illumination means for directing radiation to said code disk, said first track having first regions for directing radiation to said first pair of photocells and second regions for obscuring radiation from said first pair of photocells, said first regions and said second regions of said first track being alternate in sequence, an adjacent pair of one of said first regions of said first track and one of said second regions of said first track constituting a single cycle of said first track, a second pair of photocells in registration with a second track of said plurality of tracks, said second pair of photocells being spaced from each other predeterminedly, said second track having first regions for directing radiation to said second pair of photocells and second regions for obscuring radiation from said second pair of photocells, said first regions and said second regions of said second track being alternate in sequence, an adjacent pair of one of said first regions of said second track and one of said second regions of said second track, a plurality of additional photocells in proper registration with remaining tracks of said code disk, said first pairs of photocells generating first pairs of sinusoidal signals, first signals of said first pairs being approximately in phase with each other, second signals of said first pairs being in-phase with each other, a plurality of first pairs of amplifiers for amplifying said first pairs of signals, a plurality of first pairs of inverters for producing a plurality of first pairs of inverted signals in response to a plurality of first pairs of amplified signals for said plurality of first pairs of amplifiers, a plurality of first bridges each having a number of impedances separated from each other by taps in sequence along lengths thereof, said plurality of first pairs of amplified signals being applied to a plurality of first pairs of spaced taps of said plurality of first bridges, said plurality of first pairs of inverted signals being applied to a plurality of second pairs of spaced taps of said plurality of first bridges, an increased number of pairs of signals appearing at said taps of said plurality of first bridges, said second pair of photocells generating a second pair of sinusoidal signals, a second pair of amplifiers for amplifying said first pair of signals, a second pair of inverters for producing a second pair of inverted signals in response to a second pair of amplified signals from said second pair of amplifiers, a second bridge having a number of impedances separated from each other by taps in sequence along lengths thereof, said second pair of amplified signals being applied to a first pair of spaced taps of said second bridge, said second pair of inverted signals being applied to a second pair of spaced taps of said second bridge, an increased number of pairs of signals appearing at said taps of said second bridge, a plural number of first flip-flops for receiving said increased number of pairs of signals at said taps of said plurality of first bridges, a plural number of second flip-flops for receiving said increased number of pairs of signals at said taps of said second bridge, a plural number of additional flip-flops operatively responsive to signals from said additional photocells, said first flip-flops providing together a coded indication of said angle.

References Cited by the Examiner

UNITED STATES PATENTS 3,152,325 10/1964 Kaestner ----------- 340—347

MAYNARD R. WILBUR, *Primary Examiner.*

DARYL W. COOK, *Examiner.*

K. STEVENS, *Assistant Examiner.*